US006009781A

United States Patent [19]

McNeil

[11] Patent Number: 6,009,781

[45] Date of Patent: Jan. 4, 2000

[54] DIFFERENTIAL-SPACING PERFORATING ROLL

[75] Inventor: Kevin Benson McNeil, Loveland, Ohio

[73] Assignee: The Procter & Gamble Company, Cincinnati, Ohio

[21] Appl. No.: 09/032,199

[22] Filed: Feb. 27, 1998

[51] Int. Cl.[7] .............................. B23D 25/02; B26F 1/24

[52] U.S. Cl. .................................. 83/37; 83/304; 83/341; 83/660; 83/698.51

[58] Field of Search ................................ 83/37, 304, 305, 83/341, 658, 660, 664, 676, 698.51

[56] References Cited

U.S. PATENT DOCUMENTS

| | | | |
|---|---|---|---|
| 2,682,306 | 6/1954 | Schriber . | |
| 3,056,323 | 10/1962 | Kwitek | 83/342 |
| 3,073,196 | 1/1963 | Marcalus | 83/341 |
| 3,182,540 | 5/1965 | Eichorn et al. . | |
| 3,190,163 | 6/1965 | Bradley | 83/342 |
| 3,526,349 | 9/1970 | Moro | 83/660 |
| 3,782,650 | 1/1974 | Donnell, Jr. | 83/369 |
| 4,009,626 | 3/1977 | Gressman | 83/698.51 |
| 4,485,710 | 12/1984 | Schlisio et al. | 83/698.51 |
| 4,487,377 | 12/1984 | Perini . | |
| 4,640,165 | 2/1987 | McMahon et al. | 83/698.51 |
| 4,806,303 | 2/1989 | Bianco et al. . | |
| 5,125,302 | 6/1992 | Biagiotti . | |
| 5,367,936 | 11/1994 | Held et al. . | |
| 5,465,461 | 11/1995 | Herd . | |

FOREIGN PATENT DOCUMENTS

| | | |
|---|---|---|
| 23 15 171 | 10/1974 | Germany . |

*Primary Examiner*—M. Rachuba
*Assistant Examiner*—Sean Pryor
*Attorney, Agent, or Firm*—Vladimir Vitenberg; Larry L. Huston; Donald E. Hasse

[57] ABSTRACT

A rotatable perforating roll, for use in a continuously operating paper-converting rewinder, comprises at least a first plurality of pockets and a second plurality of pockets, each of the pockets designed to receive at least one perforating surface therein. The pockets are spaced apart from one another along the roll's outer circumference such that the pockets of the first plurality are equally spaced from one another at a first angular distance, and the pockets of the second plurality are equally spaced from one another at a second angular distance different from said first angular distance, but the pockets of the first plurality are unequally spaced from the pockets of the second plurality.

17 Claims, 4 Drawing Sheets

DIFFERENTIAL-SPACING PERFORATING ROLL

FIELD OF THE INVENTION

The present invention relates to a means for perforating various web products into sheets. Particularly, the present invention relates to a novel perforating roll for use in rewinding equipment for perforating webs, such as, for example, toilet tissue and paper towels.

BACKGROUND OF THE INVENTION

Paper products are in frequent use in today's society. Core wound paper products, such as toilet tissue and paper towels, often have a hollow tubular core about which a roll of the product is wound. A consumer usually does not use the entire roll of the paper product at once. To aid the consumer in selecting and dispensing the proper portions of the product, the roll of paper product is conveniently provided with lines of weakness, generally parallel to the axis of the core about which the paper product is wound. The lines of weakness typically comprise perforations which divide the core wound paper product into individual sheets joined across the perforations, yet easily separated from one another. The perforations provide for incremental dispensing of individual and multiple sheets of the product. This feature allows the consumer to conveniently dispense a particular quantity of the product at his or her convenience. The product may also be provided in a stack. The individual sheets of the product are folded in the stack to be on the top of one another, while still divided by perforation lines.

The perforations may be made by perforating surfaces employed during the manufacturing process. During the perforating step of the manufacturing process, the web is typically interposed between two mating perforating surfaces, usually termed as a blade and an anvil, one of which (for example the blade) is attached to the perforating roll, and the other (the anvil) is attached to the stationary backing member. The blades are typically mounted on a rotating roll, or cylinder, and have alternately spaced teeth and notches across the total width of the perforator perforating surface. The teeth are responsible for the small cuts which define and divide adjacent sheets of the web product, while the notches are responsible for the lands which bridge adjacent sheets and hold the roll of sheets together. The blades attached to the rotating perforating roll strike the web while it is held against the stationary anvil and cut through the thickness of the web product.

Different web products require different sheet lengths. Therefore, today's industrial processes often demand that the length of the individual sheets in the perforated web be changed relatively fast and with minimal effort. The change of the length of the individual sheets may be accomplished by substituting one perforating roll for another perforating roll. For example, if it is desired that the length of the individual sheets in the perforated web be increased, one perforating roll may be substituted for another roll having relatively fewer perforating surfaces. The roll having the perforating surfaces spaced relatively farther apart from each other will provide a greater distance between the lines of perforation in the web. The change of the perforating rolls, however, unavoidably creates long periods of downtime and, consequently, is economically undesirable.

Commonly assigned U.S. Pat. No. 4,687,153, issued Aug. 18, 1987 to McNeil, and incorporated by reference herein, teaches that the length of individual sheets in a perforated web can be adjusted by independently controlling the velocity of the web relative to the surface velocity of the perforating roll. This patent provides great advantages over the prior art by allowing to control the length of the individual sheets in the perforated web without the necessity of changing one perforating roll for another. However, flexibility in adjusting the length of the individual sheets in the perforated web without changing the perforating roll is still somewhat limited. A range of the velocity differential between the perforating roll and the web is limited by the web's capability to accept the so called "adhering" effect of the velocity differential. At certain levels of the velocity of the web, the velocity differential between the perforating roll and the web may cause the individual sheets to partially separate along the perforations ("perforation popping") and may even lead to breakout of the web. It has been found, for example, that some paper tissue webs tolerate only up to about −20% ("underspeed") velocity differential between the perforating roll and the web. As used herein, the term "underspeed" indicates that the peripheral velocity of the perforating roll is less than the velocity of the web. By analogy, the term "overspeed" indicates that the peripheral velocity of the perforating roll is greater than the velocity of the web. Overspeed is limited by several considerations, the important one of which is avoiding vibration of the rewinding equipment at the industrial-scale velocities, which vibration was found to take place at the overspeed levels of about +100% and greater. Therefore, it is believed that, the preferred range of the velocity differential between the perforating roll and the web is between about −20% (underspeed) and about +100% (overspeed). This range is dependent on many factors, such as, for example, physical properties of the web, operating tension, design of perforation (width of the land areas and spacing therebetween), interference between the blade(s) and the anvil(s), web speed, and other factors. This range cannot provide for all desirable variations of the spacing between the perforation lines and the product count without changing one perforating roll for another having a different number of the perforating surfaces.

Now it has been found that the problem may be successfully resolved by designing a novel differential-spacing perforating roll which allows much greater flexibility in controlling the length of individual sheets in the perforated web, while avoiding the perforation popping and vibration problems. Accordingly, an object of the present invention is to provide such a differential-spacing perforating roll. Another object of the present invention is to provide a process for making a perforated web using the differential-spacing perforating roll of the present invention.

BRIEF SUMMARY OF THE INVENTION

The present invention provides a differential-spacing perforating roll which allows one to adjust spacing between perforation lines in a web being perforated, without adjusting relative velocities of the web and the roll, and without changing the perforating roll itself. Additionally, when used in combination with a means for controlling the velocity differential between the web and the perforating roll, the differential-spacing perforating roll of the present invention provides a much wider range of adjustability of the spacing between the perforation lines in the web.

The perforating roll, or simply "roll," of the present invention has an axis of rotation coinciding with the geometrical axis of the roll, and an outer circumference. The roll comprises a multiplicity of pockets spaced apart from one another along the roll's outer circumference, each of the pockets being designed to receive at least one perforating surface therein. The perforating surface is a generic term including both a perforating blade and an anvil. Either the blades or the anvils may be attached to the roll of the present invention; and either the anvil or the blade may be attached to a backing member juxtaposed with the roll. To distinguish between the two types of perforating surfaces, the perforating surface which is attached to the backing member is termed as a "backing perforating surface." The blade's movement relative to the anvil and an impact therebetween may produce a line of perforation.

The pockets are spaced apart from one another such that an angular distance between at least one pair of adjacent pockets is greater than an angular distance of at least one other pair of adjacent pockets. The pockets are spaced apart from one another such that they comprise, in effect, at least two pluralities: a first plurality of pockets and a second plurality of pockets. The pockets of the first plurality are equally spaced from one another at a first angular distance; and the pockets of the second plurality are equally spaced from one another at a second angular distance. However, the pockets of the first plurality are unequally spaced from the pockets of the second plurality, which means that the angular distance between at least one pair of adjacent pockets, one of which comprises a first plurality, and the other comprises the second plurality, is greater than the angular distance of at least one other pair of adjacent pockets, one of which comprises the first plurality and the other comprises the second plurality. Preferably, one of the pluralities of pockets is greater than the other. Consequently, one of the angular distances is preferably less than the other.

In one preferred embodiment, the roll comprises seven pockets. These seven pockets include the first plurality of three pockets, and the second plurality of five pockets, one pocket being a common pocket for both the first plurality and the second plurality. The pockets of the first plurality are spaced from one another at the first angular distance corresponding to 120°; and the pockets of the second plurality are spaced from one another at the second angular distance corresponding to 72°. In another preferred embodiment, the roll comprises eight pockets, including the first plurality of four pockets, and the second plurality of six pockets, two pockets being the common pockets for both the first plurality and the second plurality. In the latter embodiment, the pockets of the first plurality are spaced from one another at the first angular distance corresponding to 90°; and the pockets of the second plurality are spaced from one another at the second angular distance corresponding to 60°.

The perforating surfaces may be attached to only one plurality of pockets—either the first plurality or the second plurality. In one embodiment, the perforating surfaces are fixedly attached to the pockets of only one of the pluralities. Then, to reconfigure the roll, one may remove the perforating surfaces attached to the pockets of one of the pluralities, and attach the perforating surfaces to the pockets of the other plurality. The pockets which do not have the perforating surfaces therein are preferably filled with fillers designed to provide support for the web and to balance the roll for smooth rotation.

In another embodiment, at least some of the perforating surfaces are movably attached to at least some of the pockets. In this instance, the perforating surfaces are capable of being moved from an "active" position, in which the perforating surfaces contact the backing perforating surface during the roll's rotation thereby perforating the web, to a "passive" position, in which the perforating surfaces do not contact the backing perforating surface during the roll's rotation. In the embodiment in which all the pockets of at least one plurality have the perforating surfaces which are movably attached thereto, there is no need to remove the movable perforating surfaces from the pockets to reconfigure the roll; all that is needed is to move the movable perforating surfaces from the active position to the passive position or vice versa. In the passive position, the perforating surfaces are fully or partially recessed within the pocket. When in use, the perforating surfaces are slidably extended from the passive position within the pocket to the active position to contact the backing perforating surface attached to the backing member during the roll's rotation, i.e., as far as required to provide a proper contact between the mating perforating surfaces. In one preferred embodiment, each of the pockets of both the first plurality and the second plurality has at least one perforating surface movably attached thereto. Then, one may easily reconfigure the roll by activating the perforating surfaces movably attached to the pockets of one of the pluralities and deactivating the perforating surfaces movably attached to the pockets of the other plurality.

The roll having the movable perforating surfaces preferably comprises an activating means for moving the perforating surface from the passive position to the active position. The activating means may be designed such as to provide a slidably-retractable movement of the perforating surfaces. The activating means may also be designed to provide a rotatably-extendible movement, instead of slidably-extendible movement. In the latter instance, the perforating surface rotates from the recessed, passive position inside the pocket to the active position for a proper contact with the backing perforating surface attached to the backing member during the roll's rotation. Other means for changing the position of the perforating surface relative to the roll's center of rotation may also be used.

A process for making a perforated web comprises the steps of providing a parent roll of web; providing a means for continuously unwinding the parent roll and forwarding the web in a machine direction; providing a plurality of perforating surfaces; providing a perforating roll of the present invention, comprising at least two pluralities of pockets unequally spaced relative to each other; attaching the perforating surfaces to at least one of the pluralities of pockets; providing a backing member having a backing perforating surface and juxtaposed with the perforating roll such that the perforating roll and the backing member form a nip therebetween; and rotating the perforating roll, while continuously unwinding the parent roll and forwarding the web through the nip between the perforating roll and the backing member, thereby providing transverse lines of perforation across the web at substantially equal intervals in the machine direction to define product sheets in the web. If the roll having movable perforating surfaces is used, the process may include optional steps of activating the perforating surfaces attached to the pockets of only one of the pluralities and/or deactivating the perforating surfaces attached to the pockets of the other plurality. If the roll having only fixedly-attached perforating surfaces is used, the perforating surfaces are attached to the pockets of only one plurality, and reconfiguring the roll includes removing the perforating surfaces attached to the pockets of one plurality and attaching the perforating surfaces to the pockets of the other plurality.

DETAILED DESCRIPTION OF THE INVENTION

Figure 1:
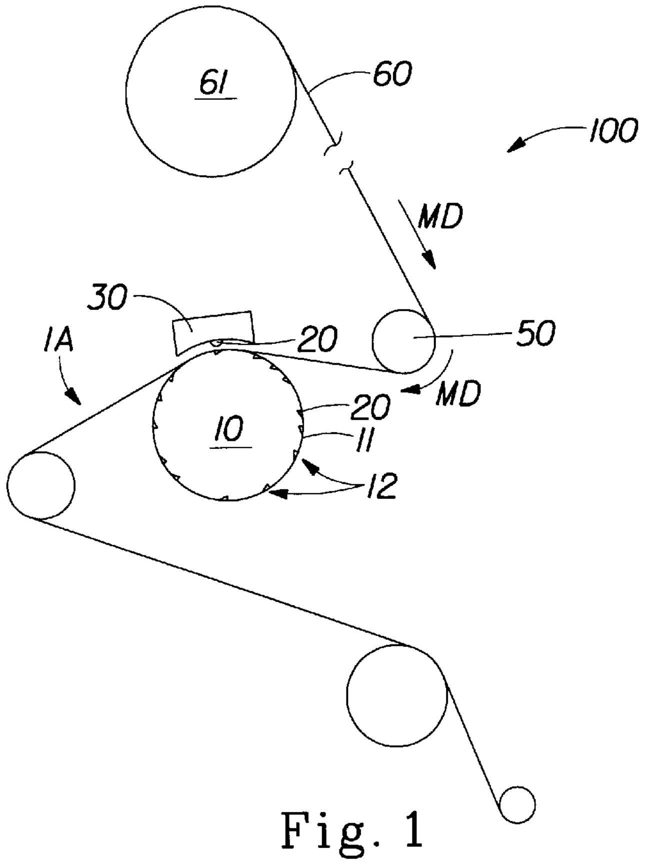
FIG. 1 is a schematic, fragmentary, side-elevational view of a process of the present invention, which process uses a rewinder comprising a differential-spacing perforating roll of the present invention.

A perforating roll 10 of the present invention may be used in a continuously operating paper-converting rewinder, such as, for example, a rewinder disclosed in commonly-assigned U.S. Pat. No. 4,687,153 issued Aug. 18, 1987, to Kevin B. McNeil, and incorporated herein by reference. A relevant fragmentary portion of such a rewinder, designated herein by a reference numeral 100, is schematically shown in FIG. 1. The rewinder 100 uses a parent roll 61 of a web 60. As used herein, the term "web" includes paper webs as well as non-paper webs, such as, for example, synthetic webs. Preferably, the web 60 is a fibrous web suitable for such disposable products as toilet tissue and paper towel. The perforating roll 10 is juxtaposed with a backing member 30. Means for continuously unwinding the parent roll 61 and forwarding the web 60 in a machine direction between the perforating roll 10 and the backing member 30 are schematically shown in FIG. 1 as comprising a feed roll 50. However, one skilled in the art will appreciate that the means for continuously unwinding the roll 61 and forwarding the web 60 may, and preferably do, comprise various other components, such as, for example, speed adjusters (not shown). As used herein, the machine direction, or MD, is a direction which is parallel to the flow of the web 60 through the rewinding equipment. A cross-machine direction, or CD, is a direction which is perpendicular to the machine direction MD and parallel to the general plane of the web 60. The backing member 30 is designed to receive at least one backing perforating surface comprising either an anvil or a blade, as will be explained herein below in greater detail.

The perforating roll 10 of the present invention, best shown in FIGS. 2–6, has an axis of rotation R coinciding with the geometrical axis of the roll. The roll 10 further has an outer circumference 11. The roll 10 may have various diameters depending on the particular equipment and the task to be performed. The roll 10 comprises a multiplicity of pockets 12, each of the pockets 12 being designed to receive at least one perforating surface therein. Depending on a specific embodiment of the perforating surfaces to be used with the roll 10, it may be desirable that the pocket 12 receives a chain of the individual perforating surfaces juxtaposed with one another in side-to-side relationship in a direction substantially parallel to the axis of rotation of the roll 10, as one skilled in the art will recognize. As used herein, however, all individual perforating surfaces attached to the single pocket 12 for the purpose of producing a single transverse (CD) line of perforation in the web 60 are referred to as "at least one perforating surface 20," or simply "a perforating surface 20," as best shown in cross-sectional views in FIGS. 2–6.

As used herein, the term "perforating surface" includes both mating perforating elements, i.e., an element traditionally termed in the art as a "blade" and an element traditionally termed in the art as an "anvil." One skilled in the art will appreciate that the movement of the blade relative to the anvil and a resulting impact therebetween may produce the perforation in the web 60. Traditionally, the blade is an element which has teeth and notches determining the land area in the line of perforation, while the anvil is the blade's mating surface which contacts the blade to perforate the web. Typically, the anvil has a uniform surface and is preferably attached to the stationary backing member 30. For the purposes of the present invention, the "blade" and the "anvil" are relative components; they both are defined as the "perforating surfaces." In the present invention, therefore, the pockets 12 of the roll 10 are capable of receiving both types of the perforating surfaces 20—either the blades or the anvils. Similarly, the backing member 30 is also capable of receiving both types of the perforating surfaces 20—either the blade or the anvil. If, for example, the roll 10 of the present invention has pockets 12 which are designed to receive the blades attached thereto, the mating anvil may be attached to the backing member 30, and vice versa. To distinguish between the two types of mating perforating surfaces 20, the rotatable perforating surfaces attached to the perforating roll 10 are termed herein as "perforating surfaces," while the perforating surfaces attached to the backing member 30 are termed as a "backing perforating surface." Preferably, the backing member 30 having a backing perforating surface 20 therein is stationary.

Figure 7:
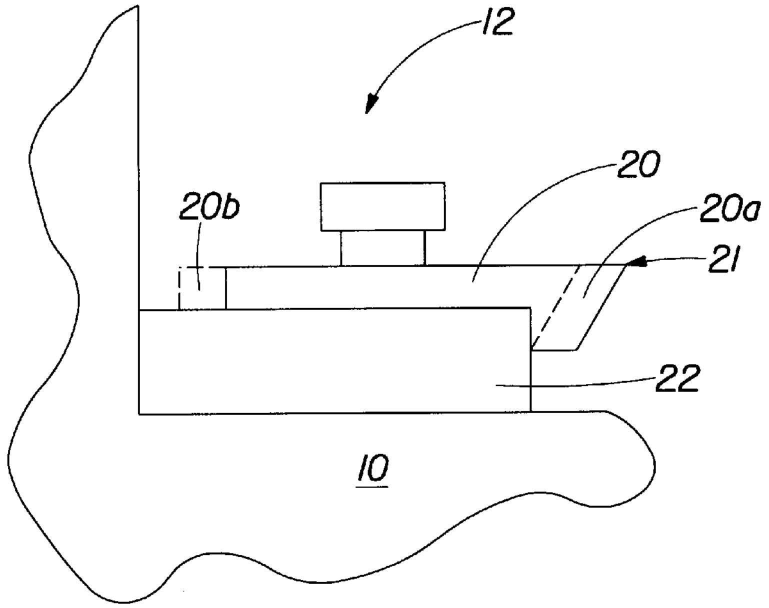
FIG. 7 is a schematic, fragmental, cross-sectional view of the roll's pocket having a slidably-extendible perforating surface movably attached thereto.

The perforating surfaces 20 may be fixedly attached to the pockets 12. Alternatively, the perforating surfaces 20 may be movably attached to the pockets 12, as shown in FIG. 7 and as will be described in greater detail below. Different types of the perforating surfaces 20 comprising the perforating blades, known in the art, may be used in the present invention. For example, commonly-assigned U.S. Pat. No. 5,114,771, issued May 19, 1992 to Randy G. Ogg, the disclosure of which patent is incorporated by reference herein, discloses a perforator blade having a relatively narrow notch width and a relatively narrow tooth width. As the notch width and the tooth width are decreased, the total notch width, which is the aggregate of the width of each notch across the total width of the blade, is similarly decreased.

The perforating roll 10 of the present invention may be used in the process of making sheet having indicia registered with lines of termination, which process is described in commonly-assigned and co-pending application Ser. No. 08/900,042, filed Jul. 24, 1997, which is continuation of Ser. No. 08/621,271, filed Mar. 25, 1996. The application teaches a process allowing to register perforations with printed patterns in core wound products. The disclosure of this application is incorporated herein by reference.

The pockets 12 are spaced apart from one another along the circumference 11 of the roll 10 in such a way that an angular distance between at least one pair of adjacent pockets 12 is greater than an angular distance of at least one other pair of adjacent pockets 12. As used herein, the term "angular distance" between two adjacent pockets 12 means a distance between two identically-oriented geometrical points within the two adjacent pockets 12, which distance is measured along a circumference having a geometrical center in the center of rotation R of the roll 10 and connecting these identically-oriented geometrical points. For illustration, such identically-oriented geometrical points within the pockets 12 may conveniently be designated as edges 21 of the perforating surfaces 20 in a fixed position or an active position (described in detain below). One skilled in the art will readily understand that for a given radius of the circumference 11, every angular distance has a corresponding angle. Therefore, for a given radius of the circumference 11, the angular distance may be expressed in linear units (inches) as well as in angular units (degrees).

Figure 2:
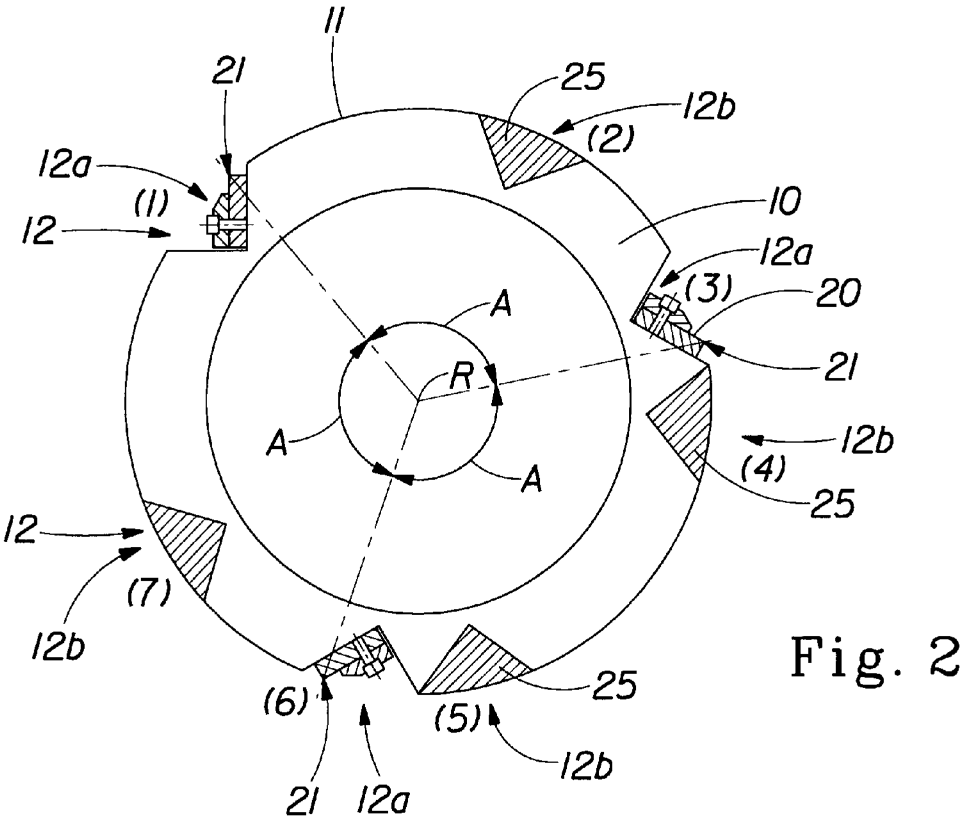
FIG. 2 is a schematic cross-sectional view of a differential-spacing perforating roll according to the present invention, having seven pockets unequally spaced from one another along the roll's outer circumference, three of the pockets comprising a first plurality and having perforating surfaces fixedly attached thereto, the angular distance between the perforating surfaces corresponding to 120°.
Figure 3:
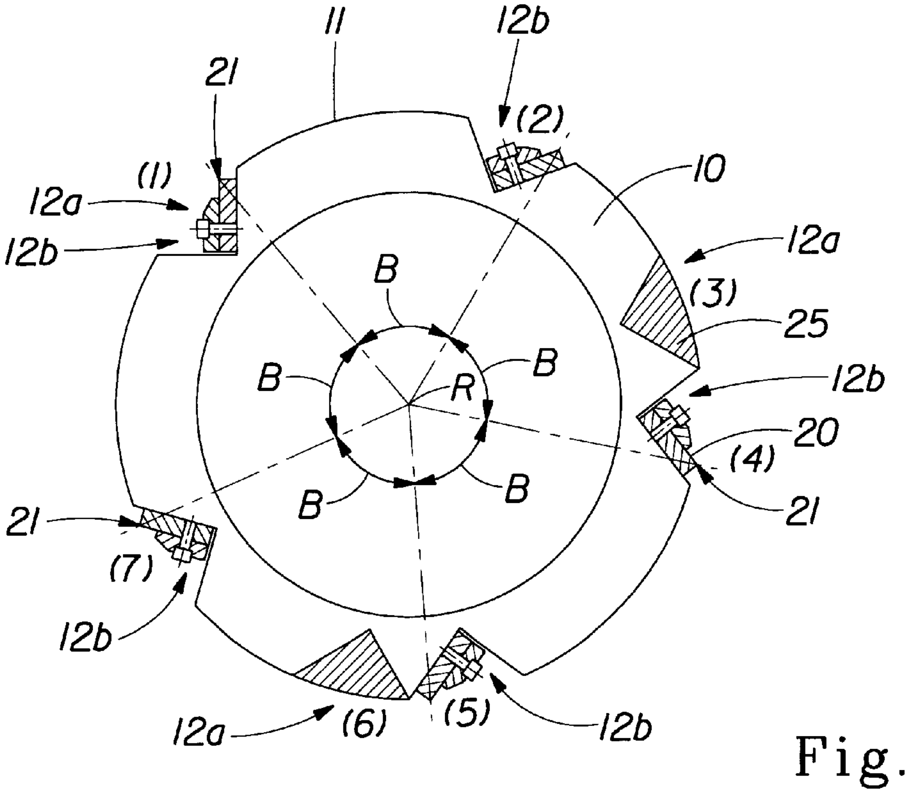
FIG. 3 is a schematic cross-sectional view of the differential-spacing perforating roll shown in FIG. 2, and showing five pockets comprising a second plurality and having the perforating surfaces attached thereto, the angular distance between the perforating surfaces corresponding to 72°.

FIGS. 2 and 3 illustrate what is meant by the requirement that the pockets 12 are spaced apart from one another along the circumference 11 such that the angular distance between at least one pair of adjacent pockets 12 is greater than the angular distance of at least one other pair of adjacent pockets 12. In FIGS. 2 and 3, the individual pockets 12 are designated for the reader's convenience by the numerals in parenthesis, clockwise from (1) to (7). As FIGS. 2 and 3 show, the angular distance between the pockets 12 designated by the numerals (1) and (2) (at least one pair of adjacent pockets 12) is greater than the angular distance between the pockets 12 designated by the numerals (3) and (4) (at least one other pair of adjacent pockets 12). It should be carefully noted that the same pocket 12 may comprise both pairs of pockets 12 being compared. For example, in FIGS. 2 and 3, the angular distance between the pockets 12 designated by (2) and (3) is greater than the angular distance between the pockets 12 designated by (3) and (4). In the latter example, the pocket 12 designated by (3) comprises both pairs of pockets 12 being compared.

According to the present invention, the pockets 12 are spaced apart from one another such that they comprise, in effect, at least two pluralities of pockets 12: a first plurality 12*a* of pockets 12 and a second plurality 12*b* of pockets 12, as shown in FIGS. 2–5. Of course, if desired, the pockets 12 may comprise more than two pluralities. For example, FIG. 6 shows the roll 10 comprising a third plurality 12*c* of pockets 12. As used herein, the generic designation "pocket 12" applies to each and every pocket, whether it belongs to the first plurality 12*a*, the second plurality 12*b*, the third plurality 12*c*, or other plurality; and the term "multiplicity of pockets 12" includes all pluralities of pockets 12: 12*a*, 12*b*, and all other pluralities as the case may be. For convenience, the description is provided herein in the context of at least two pluralities, the first plurality 12*a* and the second plurality 12*b*. However, it should be appreciated that the number of the pluralities of pockets 12 is not restricted in the present invention.

The individual plurality (12*a*, 12*b*) of the pockets 12 is defined herein according to the requirement that within each individual plurality (12*a*, 12*b*) the pockets 12 are equally spaced apart from one another. Thus, the pockets 12 of the first plurality 12*a* are equally spaced from one another at a first angular distance; and the pockets 12 of the second plurality 12*b* are equally spaced from one another at a second angular distance. However, in accordance with the present invention, the pockets 12 of the first plurality 12*a* are unequally spaced from the pockets 12 of the second plurality 12*b*. The latter requirement means that the angular distance between at least one pair of adjacent pockets 12, one of which comprises a first plurality 12*a*, and the other comprises the second plurality 12*b*, is greater than the angular distance between at least one other pair of adjacent pockets 12, one of which comprises the first plurality 12*a* and the other comprises the second plurality 12*b*. In FIG. 3, for example, the angular distance between the pocket 12 designated by the numeral (3) and comprising the first plurality 12*a* and the pocket 12 designated by the numeral (4) and comprising the second plurality 12*b* is less than the angular distance between the pair of the pockets 12 designated by the numerals (6) (the first plurality 12*a*) and (7) (the second plurality 12*b*).

The number of the pockets 12 comprising one plurality (for example, the second plurality 12*b* in FIGS. 2–5) is greater than the number of the pockets 12 comprising the other plurality (the first plurality 12*a*). Consequently, the first angular distance between the pockets 12 of the first plurality 12*a* is greater than the second angular distance between the pockets 12 of the second plurality 12*b*.

FIGS. 2 and 3 show one preferred embodiment of the roll 10 of the present invention, comprising seven pockets 12, unequally spaced apart from one another along the roll's circumference 11. These seven pockets 12 comprise the first plurality 12*a* and the second plurality 12*b*, defined herein above. The first plurality 12*a* comprises three pockets 12; and the second plurality 12*b* comprises five pockets 12. Such roll 10 is defined herein as having a "3/5configuration." The pockets 12 of the first plurality 12*a* are spaced from one another at the first angular distance corresponding to 120° (angle A in FIG. 2); and the pockets 12 of the second plurality 12*b* are spaced from one another at the second angular distance corresponding to 72° (angle B in FIG. 3). One pocket 12, designated by the numeral (1), is a common pocket for both the first plurality 12*a* and the second plurality 12*b*. While the embodiment in which both pluralities 12*a*, 12*b* have at least one pocket 12 in common is preferred, it should be pointed out that it is not necessary; the scope of the present invention encompasses an embodiment (not shown) in which the first plurality 12*a* and the second plurality 12*b* do not have the pocket 12 in common.

Figure 4:
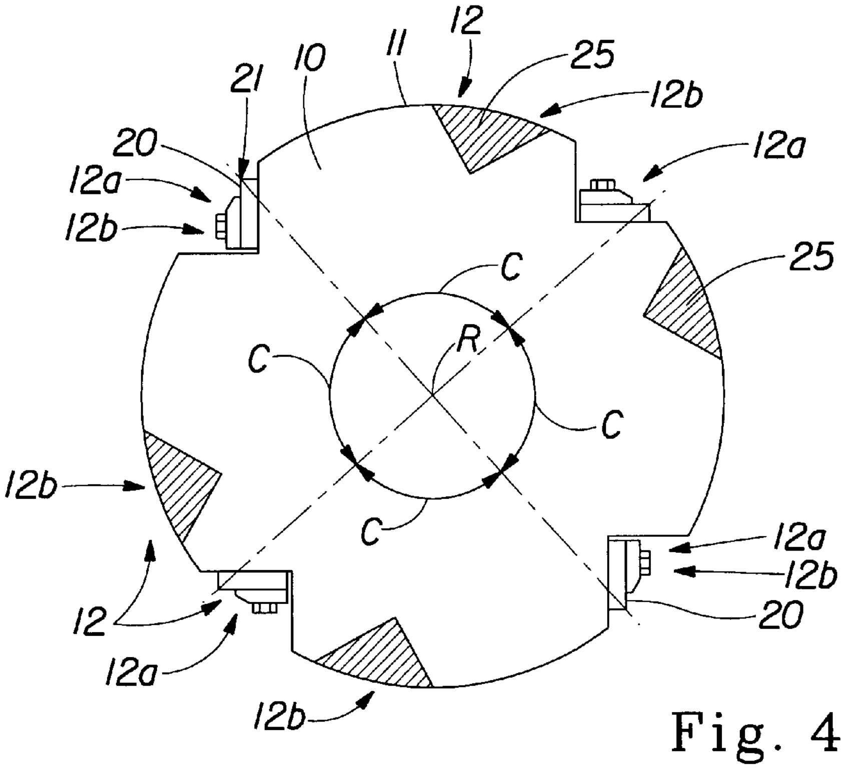
FIG. 4 is a schematic cross-sectional view of a differential-spacing perforating roll according to the present invention, having eight pockets unequally spaced from one another along the roll's outer circumference, four of the pockets comprising a first plurality and having perforating surfaces fixedly attached thereto, the angular distance between the perforating surfaces corresponding to 90°.
Figure 5:
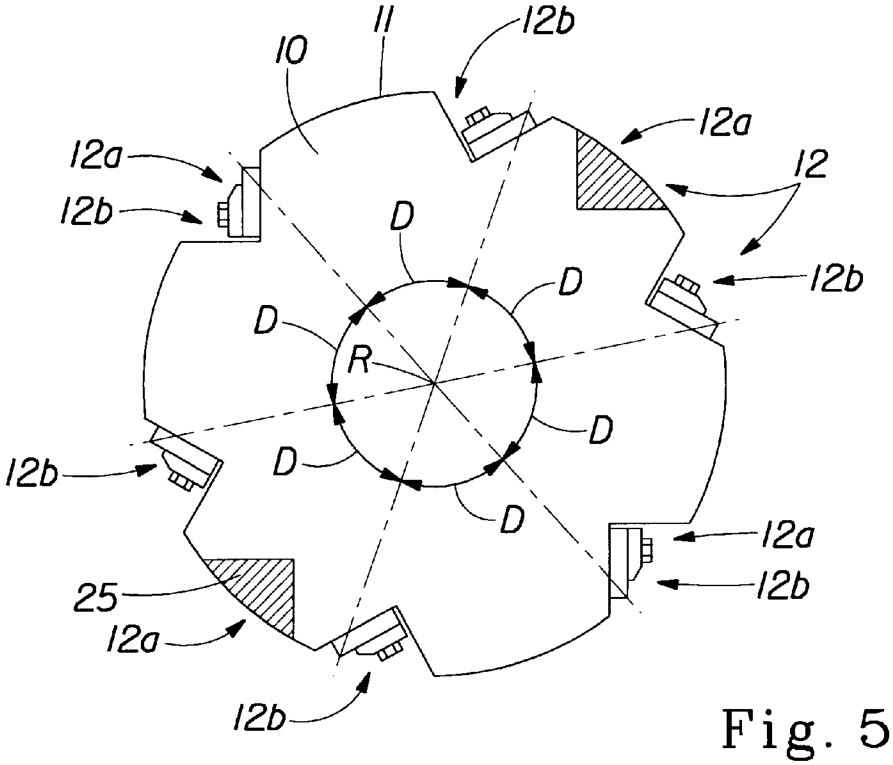
FIG. 5 is a schematic cross-sectional view of the differential-spacing perforating roll shown in FIG. 4, and showing six pockets comprising a second plurality and having the perforating surfaces attached thereto, the angular distance between the perforating surfaces corresponding to 60°.
Figure 6:
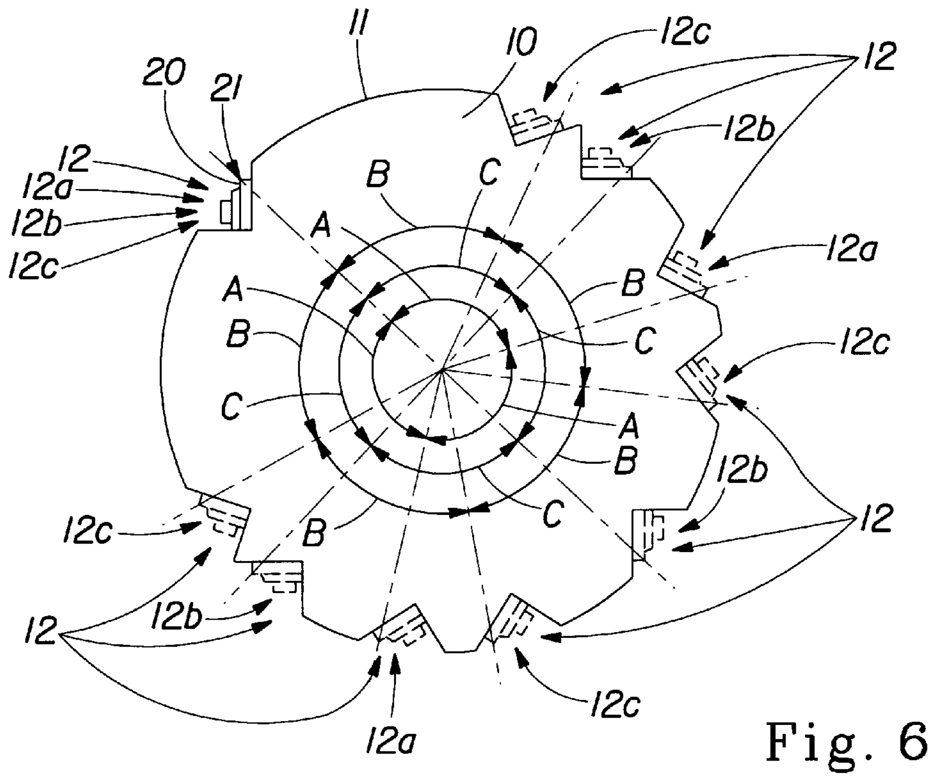
FIG. 6 is a schematic cross-sectional view of a differential-spacing perforating roll according to the present invention, having ten pockets unequally spaced from one another along the roll's outer circumference, three of the pockets comprising a first plurality, four of the pockets comprising a second plurality, and five of the pockets comprising a third plurality, one of the pockets being a common pocket for the first, second, and third pluralities.

In another preferred embodiment, shown in FIGS. 4 and 5, the roll 10 comprises eight pockets 12, including the first plurality 12*a* comprising four pockets 12, and the second plurality 12*b* comprising six pockets 12 (a "4/6 configuration"). Two pockets 12 are the common pockets for both the first plurality 12*a* and the second plurality 12*b*. In the latter embodiment, the pockets 12 of the first plurality 12*a* are spaced from one another at the first angular distance corresponding to 90° (angle C in FIG. 4); and the pockets 12 of the second plurality 12*b* are spaced from one another at the second angular distance corresponding to 60° (angle D in FIG. 5).

FIG. 6 shows still another exemplary embodiment of the roll 10 having three pluralities of pockets 12: the first plurality 12*a* comprising 3 pockets 12, the second plurality 12*b* comprising 4 pockets 12, and the third plurality 12*c* comprising 5 pockets 12. The first angular distance between the pockets 12 of the first plurality 12*a* corresponds to 120° (angle A in FIG. 6), the second angular distance between the pockets 12 of the second plurality 12*b* corresponds to 90° (angle C in FIG. 6), and the third angular distance between the pockets 12 of the third plurality corresponds to 72° (angle B in FIG. 6). The first plurality 12*a*, the second plurality 12*b*, and the third plurality 12*c* have one common pocket 12.

In accordance with the present invention, the perforating surfaces 20 may be attached only to one plurality of pockets 20—either the first plurality 12*a* or the second plurality 12*b*, as best shown in FIGS. 2–5. The pockets 12 which do not have the perforating surfaces 20 attached thereto are preferably filled with fillers 25 designed to balance the roll 10 for smooth rotation and to provide support for the web 60. In the embodiments shown in FIGS. 2–5, the perforating surfaces 20 are attached to the pockets 20 of one of the pluralities 12*a*, 12*b*, according to the required spacing between the lines of perforation in the web 60. As has been defined above, the roll 10 having the 3/5 configuration is capable to operate with either three perforating surfaces 20 (FIG. 2) or five perforating surfaces 20 (FIG. 3). The term "3-blade arrangement" (FIG. 3) refers to the roll 10 configured to operate with three perforating surfaces 20 (i. e., having three perforating surfaces attached thereto or having three perforating surfaces in the active position). Analogously, the roll 10 configured to operate with five perforating surfaces 20 is said to have a "5-blade arrangement."

In an alternative embodiment, a fragment of which is best shown in FIG. 7, at least some of the perforating surfaces 20 are movably attached to the pockets 12. In this embodiment, there is no need to remove the movably attached perforating surfaces 20 from the pockets 12 to reconfigure the roll 10. To reconfigure the roll 10, one can move the movably attached perforating surfaces 20 from an "active position" 20*a*, in which the perforating surfaces contact the backing perforating surface attached to the backing member 30 (FIG. 1) during the roll's rotation thereby properly perforating the web 60, to a "passive position" 20*b*, in which the perforating surfaces do not contact the backing perforating surface during the roll's rotation, or vice versa—from the passive position 20*b* to the active position 20*a*. The roll 10 shown in FIG. 7 preferably comprises a means 22 for moving, or "activating," the movably attached perforating surfaces 20. As used herein, the means 22 for activating the perforating surfaces 20 includes devices which provide or facilitate movement of the perforating surface 20 from the passive position to the active position and from the active position to the passive position. Such activating means 22 include, but are not limited to, slides, pivots, cams, hydraulic or pneumatic devices, and other means of controlling the displacement and/or rotation of the perforating surface 20.

As an example, FIG. 7 shows the means 22 comprising lockable slides. The perforating surface 20 is retractable by virtue of being slidably connected to the pocket 12 through the lockable slides 22. In the passive position, the perforating surfaces 20 may be fully or partially recessed within the pocket 12. When in use, the perforating surfaces 20 are slidably extendible from the passive position 20*b* within the pocket 20 to the active position 20*a*, i. e., as far as required to provide a proper contact between the perforating surfaces attached to the roll and the backing perforating surface attached to the backing member 30 to perforate the web 60. Additional means for locking, or fixing, the perforating surfaces 20 in the active position and/or passive position may also be provided. While the FIG. 7 shows the slidably-extendible design of the retractable perforating surfaces, it should be understood that other embodiments of the retractable perforating surfaces are possible, all of which are included in the scope of the present invention. For example, the perforating surfaces 20 may be designed as rotatably-extendible perforating surfaces (not shown) instead of slidably-extendible perforating surfaces. The rotatably-extendible perforating surfaces 20 rotate from the passive position inside the pocket 12 to the active position for a proper contact with the backing perforating surface attached to the backing member 30. The combination of the slidably-extendible and the rotatably-extendible designs described above is also possible, as well as any other configuration or combination which allows to extend the perforating surfaces 20 from the passive position to the active position.

Figure 1A:
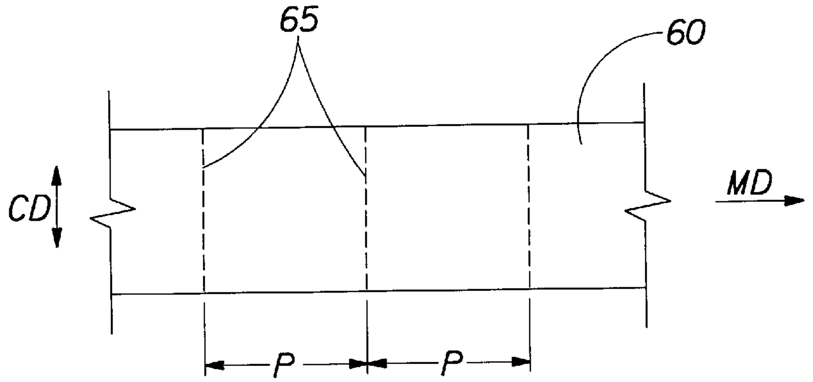
FIG. 1A is a fragmentary view taken in the direction of arrow 1A in FIG. 1, and showing a web product having transverse perforation lines equally spaced in the machine direction.

FIG. 2 shows the roll 10 comprising seven pockets 12 and having three perforating surfaces 20 attached to the first plurality 12*a* of the pockets 12. Analogously, FIG. 3 shows the same roll 10 comprising seven pockets 12 and having five perforating surfaces 20 attached to the second plurality 12*a* of pockets 12. One skilled in the art will understand that because the perforating surfaces 20 are attached to only one of the pluralities of pockets 12, the number of pockets 12 is greater than the number of perforating surfaces 20 attached thereto, or—in the case of extendible perforating surfaces—the number of pockets 12 is greater than the number of the perforating surfaces 20 in the active position. Since the pockets 12 in each plurality 12*a*, 12*b* are equally spaced apart, the perforating surfaces 20 in the active position are also equally spaced apart, and the rotating roll 10 provides the perforation lines 65 across the web 60, which are equally spaced at a distance P in the machine direction, as shown in FIG. 1A.

Using the perforating roll 10 of the present invention, one can easily substitute one plurality of pockets for the other plurality of pockets, as required, without changing the roll 10 itself. Thus, at a given velocity of rotation, the roll 10 of the present invention is easily adjustable to provide differential-spacing between the perforation lines 65 in the web 60 and/or the product's differential sheet count. The present invention, therefore, eliminates the need for changing the perforating roll, as was often necessary in the prior art, in order to change the spacing between the perforation lines 65 in the web 60 or the product's sheet count. Moreover, as has been noted herein above, commonly-assigned U.S. Pat. No. 4,687,153 discloses adjusting the sheet length and the sheet count by independently controlling the velocity of the web relative to the surface velocity of the perforating roll. The present invention, if combined with the invention disclosed in the above-mentioned patent, provides much wider ranges of controlling the spacing between the perforation lines or product's sheet count, and therefore allows a greater flexibility in controlling the rewinding/perforating process.

The following table shows some of the exemplary combinations of the configurations of the roll 10 and values of the velocity differential between the roll 10 and the web 60. The tests were conducted with the roll 10 having the length of the circumference 45.00 inches and the 3/5 configuration, principally shown in FIGS. 2 and 3 and described herein above.

TABLE

| Configuration Of the | Velocity Differential (%) | | |
|---|---|---|---|
| Roll 3/5 | 6-inch Product | 11-inch Product | 14-inch Product |
| 3-blade arrangement | +150.00 | +36.36 | +7.14 |
| 5-blade arrangement | +50.00 | −18.18 | −35.71 |

As used in TABLE, the definitions "6-inch product," "11-inch product," or "14-inch product" mean the web 60 having lines of perforations equally spaced from one another in the machine direction at 6 inches (152.4 millimeters), 11 inches (279.4 millimeters), or 14 inches (355.6 millimeters). The overspeed (meaning that the velocity of the roll 10 is greater than the velocity of the web 60, as defined herein above) is indicated by the plus ("+") symbol in the TABLE. The underspeed (meaning that the velocity of the roll 10 is less than the velocity of the web 60) is indicated by the minus ("−") symbol in the TABLE. Without being limited by theory, the applicant found that the paper web and the rewinding/perforating equipment best tolerates the range of the velocity differential from about −20% to about +100%. It should be understood that this range is an approximate range that can vary depending on several factors, including but not limited to, the type of the web 60 being perforated and its velocity, as well as the design of the rewinding equipment.

As TABLE shows, for the 3-blade arrangement, the velocity differential necessary to produce an exemplary 11-inch product and an exemplary 14-inch product is +36.36% and +7.14%, respectively, which is well within the limits of the preferred range of the velocity differential. At the same time, for the same 3-blade arrangement, the velocity differential necessary to produce a 6-inch product is +150%, which is outside the preferred range of the velocity differential. Therefore, the prior art's perforating roll having 3 perforating surfaces but lacking the capability of being reconfigured cannot produce the 6-inch product having perforations of acceptable quality. The prior art roll would have to be removed and substituted by another roll having a greater number of perforating surfaces, or alternatively, having a smaller diameter. In contrast with the prior art, the roll 10 of the present invention, having the 3/5 configuration, need not be substituted for another roll. All that is needed is deactivating the perforating surfaces 20 of the 3-blade arrangement, i.e., the perforating surfaces 20 which are attached to the pockets 12 of the first plurality 12*a*, and activating the perforating surfaces 20 of the 5-blade arrangement, i. e., the perforating surfaces 20 which are attached to the pockets 12 of the second plurality 12*b*, as best shown in FIGS. 2 and 3. As TABLE shows, for the 5-blade arrangement, the velocity differential necessary to produce an exemplary 6-inch product is only +50%, which is well within the acceptable range of the velocity differential. The term "deactivating" the perforating surfaces 20 is used herein to describe retracting the perforating surfaces 20 from the active position to the passive position, or removing the perforating surface 20 from the pockets 12.

It should also be noted that, as TABLE shows, the length of the product may easily be changed from 6 inches to 11 inches by simply changing the velocity differential from +50.00% to −18.18% (both within the preferred range of the velocity differential) of the roll 10 of the present invention, having the 3-blade arrangement, and even without reconfiguring the roll 10. The same 3/5 configuration roll having the alternative 5-blade arrangement is capable of changing the length of the product from 6 inches to 11 inches without being reconfigured. Both the 3-blade arrangement and the 5-blade arrangement are capable of producing the 11-inch product, because the +36.36% velocity differential and the −18.18% velocity differential are both within the preferred range. This feature of the roll 10 of the present invention advantageously provides a high level of flexibility in choosing and using the rewinding equipment, while taking into consideration the type and the velocity of the web being perforated. For example, a certain type of the web 60 may tolerate the +36.36% overspeed better than −18.18% underspeed, while a certain type of the rewinding equipment may, at certain velocities, be less susceptible to the vibration at the −18.18% underspeed, relative to the +36.36% overspeed.

What is claimed is:

1. A rotatable perforating roll having an outer circumference, for use in a continuously operating paper-converting rewinder, said roll comprising:

at least a first plurality of pockets and a second plurality of pockets, each of the pockets of said at least first and second pluralities designed to receive at least one perforating surface therein, said pockets being spaced apart from one another along said outer circumference such that the pockets of said first plurality are equally spaced from one another at a first angular distance, and the pockets of said second plurality are equally spaced from one another at a second angular distance different from said first angular distance, the pockets of said first plurality being unequally spaced from the pockets of said second plurality, said first plurality of pockets and said second plurality of pockets having at least one of said pockets in common.

2. The roll according to claim 1, further comprising a plurality of perforating surfaces, each of the pockets of at least one of said at least first and second pluralities having at least one of said perforating surfaces attached thereto.

3. The roll according to claim 2, wherein the pockets of only one of said at least first and second pluralities have said perforating surfaces fixedly attached thereto.

4. The roll according to claim 2, wherein at least some of said perforating surfaces are movably attached to said pockets to move between an active position and a passive position.

5. The roll according to claim 4, wherein each of the pockets of said at least first and second pluralities has at least one of said perforating surfaces attached thereto, the perforating surfaces attached to the pockets of said first plurality being in said active position, and the perforating surfaces attached to the pockets of said second plurality being in said passive position.

6. The roll according to claim 2, wherein a number of the pockets of said second plurality is greater than a number of the pockets of said first plurality.

7. The roll according to claim 1, wherein said first angular distance corresponds to 120°.

8. The roll according to claim 7, wherein said second angular distance corresponds to 72°.

9. The roll according to claim 1, wherein said first angular distance corresponds to 90°.

10. The roll according to claim 9, wherein said second angular distance corresponds to 60°.

11. The roll according to claim 1, further comprising a third plurality of pockets equally spaced apart from one another along said outer circumference at a third angular distance different from said first angular distance and said second angular distance.

12. The roll according to claim 11, wherein said first plurality of pockets, said second plurality of pockets, and said third plurality of pockets have at least one of said pockets in common.

13. A process for making a perforated web, comprising the following steps:

(a) providing a parent roll of web;

(b) providing a means for continuously unwinding said parent roll and forwarding said web in a machine direction;

(c) providing a plurality of perforating surfaces;

(d) providing a perforating roll having an outer circumference and comprising at least a first plurality of pockets and a second plurality of pockets, each of the pockets of said pluralities designed to receive at least one of said perforating surfaces therein, said pockets being spaced apart from one another along said outer circumference such that the pockets of said first plurality are equally spaced from one another at a first angular distance, and the pockets of said second plurality are equally spaced from one another at a second angular distance different from said first angular distance, said first plurality of pockets and said second plurality of pockets having at least one of said pockets in common;

(e) attaching at least one of said perforating surfaces to each of the pockets of at least one of said first and second pluralities;

(f) providing a backing member juxtaposed with said perforating roll such that said perforating roll and said backing member form a nip therebetween, said backing member having at least one backing perforating surface attached thereto to contact said perforating surfaces attached to said perforating roll when said roll rotates; and (g) rotating said perforating roll having said perforating surfaces attached thereto, while continuously unwinding said parent roll and forwarding said web through said nip between said perforating roll and said backing member, thereby providing transverse lines of perforation across said web at substantially equal intervals in said machine direction to define product sheets of said web.

14. The process according to claim 13, further comprising the step of activating the perforating surfaces attached to only one of said pluralities of pockets.

15. The process according to claim 13, further comprising a step of filling the pockets of one of said first and second pluralities, which pockets do not have said perforating surfaces attached thereto, with fillers to provide support for the web and to balance said perforating roll for balanced rotation.

16. The process according to claim 13, wherein in said step (d) said first plurality and said second plurality comprise together seven pockets.

17. The process according to claim 13, wherein in said step (d) said first plurality and said second plurality comprise together eight pockets.

* * * * *